United States Patent
Maeda et al.

(10) Patent No.: US 6,468,822 B2
(45) Date of Patent: Oct. 22, 2002

(54) METHOD FOR MANUFACTURING ELECTRO-OPTIC ELEMENT

(75) Inventors: Yoichiro Maeda; Nobuhiro Nakamura; Nobuaki Ishiga; Kazunori Inoue, all of Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/820,939

(22) Filed: Mar. 30, 2001

(65) Prior Publication Data

US 2001/0029054 A1 Oct. 11, 2001

(30) Foreign Application Priority Data

Mar. 30, 2000 (JP) .......................................... 2000-095436

(51) Int. Cl.[7] .............................................. H01L 21/00
(52) U.S. Cl. .......................................... 438/30; 257/59
(58) Field of Search ................................. 438/149, 158, 438/30, 166; 257/59, 72

(56) References Cited

U.S. PATENT DOCUMENTS

| 6,016,178 A | 1/2000 | Kataoka et al. .............. 349/117 |
| 6,252,247 B1 * | 6/2001 | Sakata et al. .................. 257/57 |
| 6,339,230 B1 * | 1/2002 | Lee et al. ...................... 257/88 |

* cited by examiner

Primary Examiner—David Nelms
Assistant Examiner—Quoc Hoang
(74) Attorney, Agent, or Firm—Oblon, Spivak, McClelland, Maier & Neustadt, P.C.

(57) ABSTRACT

By using a metal thin film comprising a layer of metal and a layer obtained by adding nitrogen atoms to metal for a metal thin film which becomes a gate electrode and the like, and for a metal thin film which becomes a source electrode and a drain electrode, there is prepared electro-optic elements free from display defects caused by high contact resistance at connected portion of the pixel electrode with the above electrodes even when a low resistance line material is used.

9 Claims, 9 Drawing Sheets

METHOD FOR MANUFACTURING ELECTRO-OPTIC ELEMENT

BACKGROUND OF THE INVENTION

The present invention relates to a method for manufacturing a liquid crystal display (hereinafter referred to as LCD) of an active matrix type with a thin film transistor (hereinafter referred to as TFT) used for a switching element, and more specifically to a method for manufacturing an active matrix type liquid crystal display using TFT (TFT-LCD) with improved display characteristics and productivity by forming a TFT array substrate with little point defect and line defect through five photo-lithography processes also using a line material having low resistance for a gate line and a source line.

Electro-optic elements for a display using a liquid crystal are popularly applied to products with its thin element and low electric consumption being highly appreciated, as one of the flat panel displays alternative to CRT.

For an electro-optic element for display using a liquid crystal, there are a simple matrix type LCD and TFT-LCD which uses TFT as a switching element. The TFT-LCD which has characteristics superior to CRT or the simple matrix type LCD in terms of portability and display quality has been popularly commercialized as notebook-size personal computers and the like. Generally, a liquid crystal layer is interposed between a TFT array substrate and an opposite substrate in TFT-LCD. On the TFT array substrate, TFT is formed as an array. On the opposite substrate, a common electrode and a color filter are mounted. On the outside of this kind of TFT array substrate and the opposite substrate, a polarizer is provided, respectively, and in addition, on one side, a back light is provided. With this kind of construction, satisfactory color display can be obtained.

However, in the TFT-LCD, it is necessary to fabricate the TFT array substrate in which TFT is formed as an array on a glass substrate using a technique for preparing semiconductor, and a great number of processes are required. As a result, there are problems that various defects are likely to occur, yield is decreased, more manufacturing equipment is required and that manufacturing cost is increased thereby.

As a method for solving these problems, Japanese Unexamined Patent Publication No. 268353/1998 discloses a method for manufacturing an active matrix type liquid crystal display, in which TFT array substrate is prepared through five photo-lithography processes.

FIGS. 7 to 9 are cross-sectional illustrations of a principal portion of a conventional TFT array substrate disclosed in Japanese Unexamined Patent Publication No. 268353/1998 (indicating components on an insulating substrate), and FIG. 3 is a plane explanatory view.

The cross-section of FIG. 7 schematically shows the cross-sectional construction taken on line X—X of FIG. 3, while FIGS. 8 and 9 schematically show the cross sectional constructions of a TCP terminal portion provided outside the display area, respectively. The TCP connects a signal potential source for supplying signal potential to be inputted to a gate line, a source line, an auxiliary capacity line and a common electrode of the opposite substrate, with the gate line, the source line, the auxiliary capacity line and the common electrode.

Referring to FIGS. 7 to 9 and FIG. 3, numeral 1 denotes a gate electrode, 2 an auxiliary capacity electrode, 3 a gate insulating film, 4 a semiconductor active film, 5 an ohmic contact film, 6 a drain electrode, 7 a source electrode, 8 a passivation film, 9 a pixel contact hole, 10 a portion having auxiliary capacity (hereinafter referred to as "auxiliary capacity"), 11 an pixel electrode, 12 a first display portion lead-out line, 13 a first TCP connection electrode, 14 a first TCP terminal contact, 15 a first TCP connection range, 16 a second display portion lead-out line, 17 a second TCP connection electrode, 18 a second TCP terminal contact, 19 a second TCP connection range, 20 an auxiliary capacity line, 21 a gate line, 22 a source line and 23 a semiconductor active film and ohmic contact film.

The gate electrode 1 is an electrode which is a part of the gate line 21 or an electrode serving as a terminal which branches off from the gate line 21 to connect to each TFT. The auxiliary capacity electrode 2 is an electrode which branches off from the auxiliary capacity line 20 and part of which is extended to a position where the electrode overlaps the pixel electrode 11. Between the auxiliary capacity electrode 2 and the pixel electrode 11, the auxiliary capacity 10 is formed with a laminated film comprising a first insulating film (the gate insulating film 3) and a second insulating film as a dielectric substance. The auxiliary capacity 10 is formed in electrically parallel to a liquid crystal capacity formed between the pixel electrode 11 and the common electrode via a liquid crystal. The semiconductor active film and ohmic contact film numbered as 23 in FIG. 3 comprises two, upper and lower layers which are numbered as 4 and 5 in FIG. 7.

This conventional technique discloses a method for manufacturing a TFT array substrate through five photo-lithography processes. As an effect, it is stated that since there is no case where the source line 22 and the source electrode 7 cross over the difference formed by the semiconductor active film and the ohmic contact film 23 within the display area, disconnection of the source line 22 and the source electrode 7 can be substantially eliminated. It is also stated that though the semiconductor active film with ohmic contact film 23 is left around the pixel electrode 11, by constructing the pixel electrode, and each of the semiconductor active film with ohmic contact film 23, and the source line 22 to be separated via the second insulating film (the passivation film 8), it is possible to reduce a simple short-circuit between the source line 22 and the pixel electrode 11 due to inferior patterning of the semiconductor active film with ohmic contact film 23 and the source line 22 or a short-circuit caused by a resistance reduction of the semiconductor active film 4 due to a light irradiation.

However, according to a conventional technique disclosed in Japanese Unexamined Patent Publication No. 268353/1998,in case of using a low resistance line material (such as Al) for a metal thin film material of the gate line 21 and the source line 22, an oxide layer will be formed between the part comprising the gate line 21 or the source line 22, and the pixel electrode 11 electrically connected therewith. The oxide layer causes high contact resistance at each of the contact part of the gate line 21, and the pixel electrode 11 or the contact part of the source line 22, and the pixel electrode 11. There arises a display defect. That is, it was impossible to prepare TFT-LCD by using a low resistance line material such as Al for a line material according to the above method.

SUMMARY OF THE INVENTION

The present invention relates to a method for manufacturing electro-optic elements including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode and a second insulating substrate having an opposite substrate on which a color filter and a common electrode are formed, wherein the TFT array substrate and the opposite substrate are affixed with a liquid crystal layer interposed in-between and polarizers are placed outside the TFT array substrate and the opposite substrate, respectively, comprising the steps:

(a) forming the above gate line and the gate electrodes of the TFT by patterning a first metal thin film by a first photolithography process after forming the first metal thin film on the first insulating substrate;

(b) patterning by dry etching a semiconductor active film and an ohmic contact film by a second photolithography process wherein the semiconductor active film and the ohmic film are formed in a continuous shape and are larger than a portion in which the source line and the TFT are formed, wherein said patterning step occurs after forming a first insulating film, the semiconductor active film, and the ohmic contact film;

(c) patterning a second metal thin film by a third photolithography process after forming the second metal thin film to form a source line as well as a source electrode and a drain electrode of the TFT and etch-removing by dry etching the ohmic contact film protruding from the source line, the source electrode, and the drain electrode;

(d) patterning a second insulating film and the first insulating film in a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and (e) patterning a conductive thin film and forming the pixel electrode by a fifth photolithography process after forming the conductive thin film.

The first method for manufacturing the electro-optic device of the present invention further comprises at least two layers having a first layer of the above first metal thin film comprising metal and a second layer thereon obtained by adding nitrogen atoms on a metal.

The second method for manufacturing the electro-optic device of the present invention further comprises at least two layers having a first layer of the above second metal thin film comprising metal and a second layer thereon obtained by adding nitrogen atoms on a metal.

The third method for manufacturing the electro-optic device of the present invention further comprises the above first and second metal thin films each having at least two layers of a first layer comprising metal and a second layer thereon obtained by adding nitrogen atoms on a metal.

The forth, fifth and sixth method for manufacturing the electro-optic device of the present invention is that in the first, second or third method, the above pixel electrode can be formed by a non-crystallized, transparent thin conductive film.

The seventh, eighth and ninth method for manufacturing the electro-optic device of the present invention is that in the first, second or third method, the above non-crystallized transparent thin conductive film is multi-crystallized by annealing after the arraying step of the TFT array substrate prepared according to the above method with properties of the TFT array substrate prepared according to the above process being stabilized.

The tenth method for manufacturing the electro-optic device of the present invention is that in the first method, the second layer which is obtained by adding nitrogen atoms to the above metal can be positioned in the vicinity of the interface of the above first metal thin film electrically connected to the transparent, thin conductive film which forms the above pixel electrode through the above first contact hole.

The eleventh method for manufacturing the electro-optic device of the present invention is that in the second method, the second layer which is obtained by adding nitrogen atoms to the above metal can be positioned in the vicinity of the interface of the above second thin metal film electrically connected to the transparent, thin conductive film which forms the above pixel electrode through the above second contact hole.

The twelfth method for manufacturing the electro-optic device of the present invention is that in the third method, the second layer which is obtained by adding nitrogen atoms to the above metal can be positioned in the vicinity of the interface of the above first and second thin metal films electrically connected to the transparent, thin conductive film which forms the above pixel electrode through the above first or second contact hole.

The thirteenth, fourteenth and fifteenth method for manufacturing the electro-optic device of the present invention is that in the first, second and third method, the material comprising the above first and second metal thin film can be one metal selected from the group consisting of Al, Ta, W, Cu and Ag or an alloy comprising at least one of these metals as a main component.

The sixteenth, seventeenth and eighteenth method for manufacturing the electro-optic device of the present invention is that in the first, second and third method, the non-crystallized transparent, conductive thin film for the above pixel electrode can comprise one selected from the group consisting of $In_2O_3$, $SnO_2$, $ZnO$, an oxide obtained by mixing $In_2O_3$ with $SnO_2$ and an oxide obtained by mixing $In_2O_3$ with $ZnO$.

DETAILED DESCRIPTION

The method of manufacturing the electro-optic element related to the embodiments of the present invention is explained below with the accompanied drawings being referred.

Figure 1:
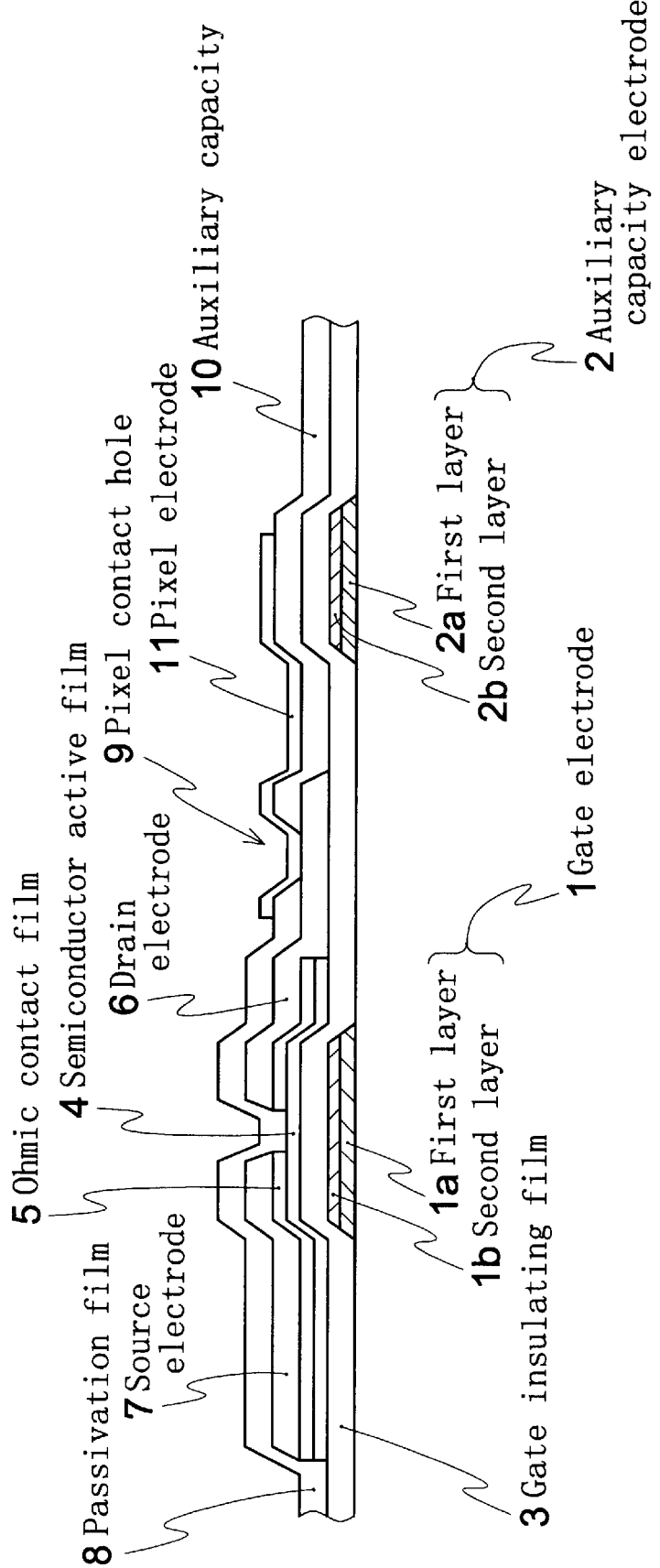
FIG. 1 is a cross-sectional view illustrating the main portion of the display pixel related to Embodiment 1 of the present invention.
Figure 2:
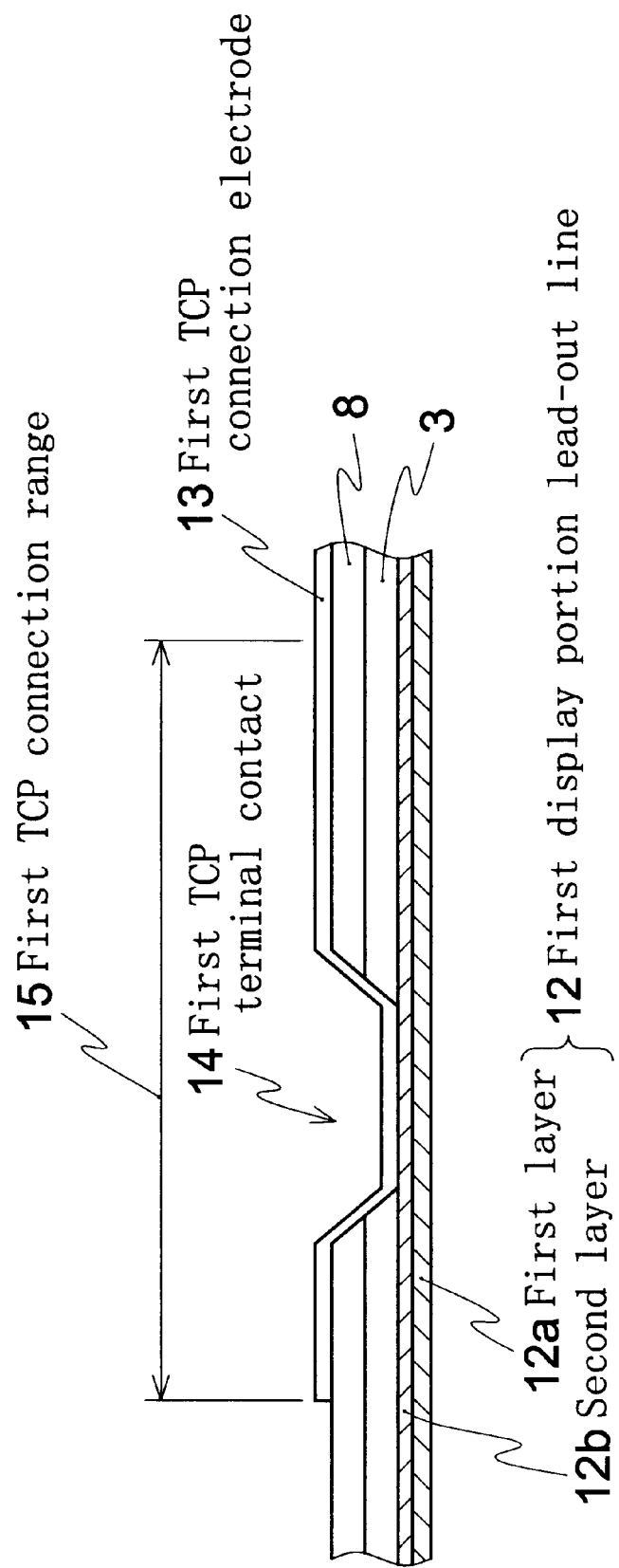
FIG. 2 is a cross-sectional view showing the cross section of the TCP terminal portion formed by the first metal thin film related to Embodiments 1 and 3 of the present invention.
Figure 3:
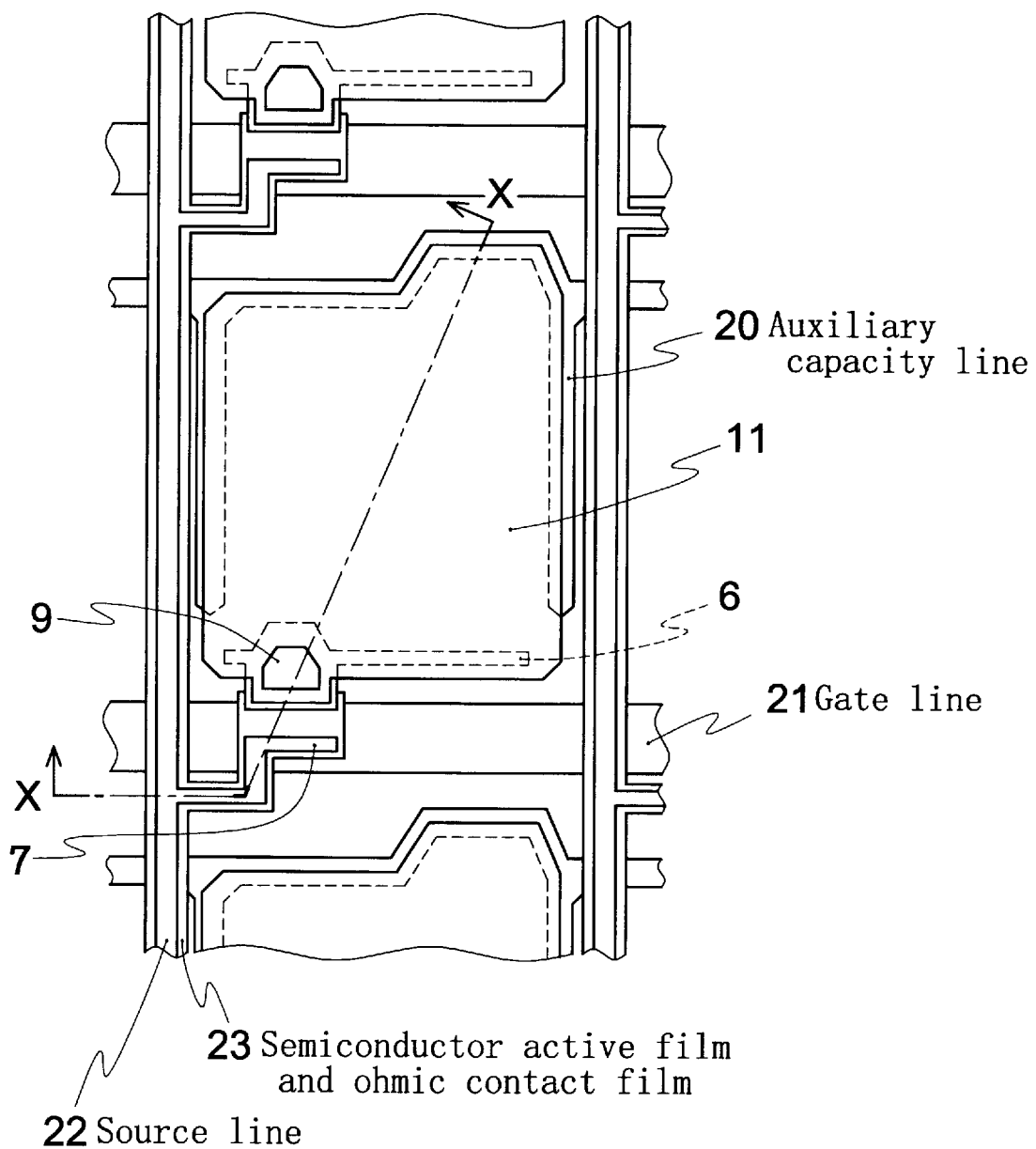
FIG. 3 is plan view illustrating the display pixel related to Embodiments 1 to 4 of the present invention and the display pixel disclosed in Japanese Unexamined Patent Publication No. 268353/1998.
Figure 4:
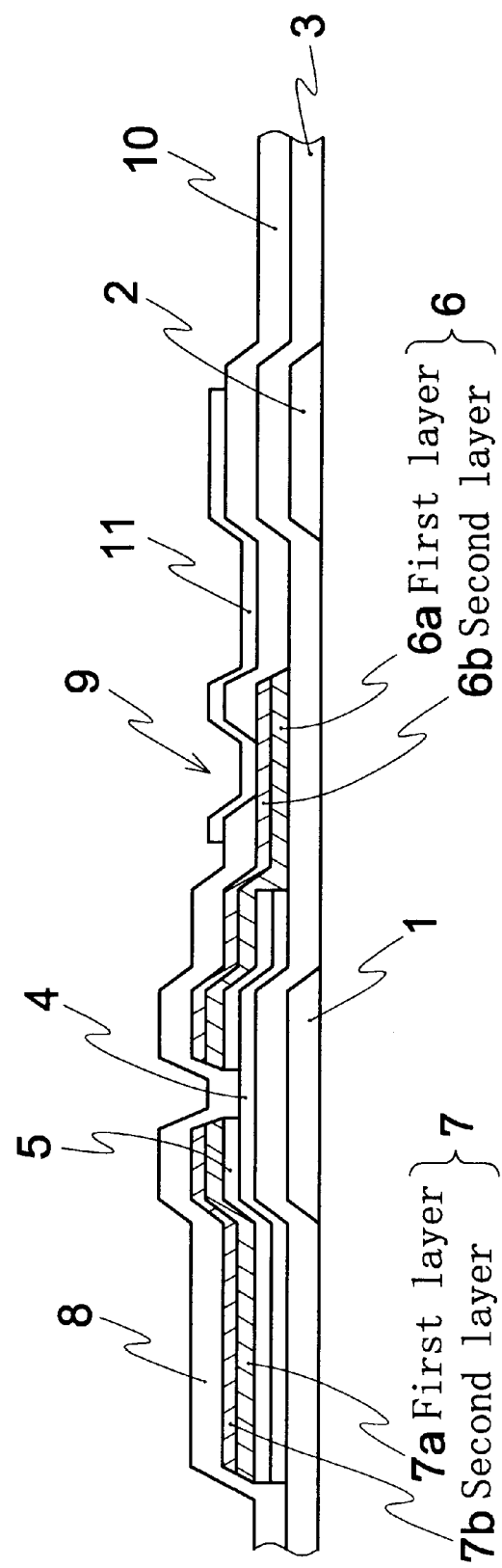
FIG. 4 is a cross-sectional view illustrating the main portion of the display pixel related to Embodiment 2 of the present invention.
Figure 5:
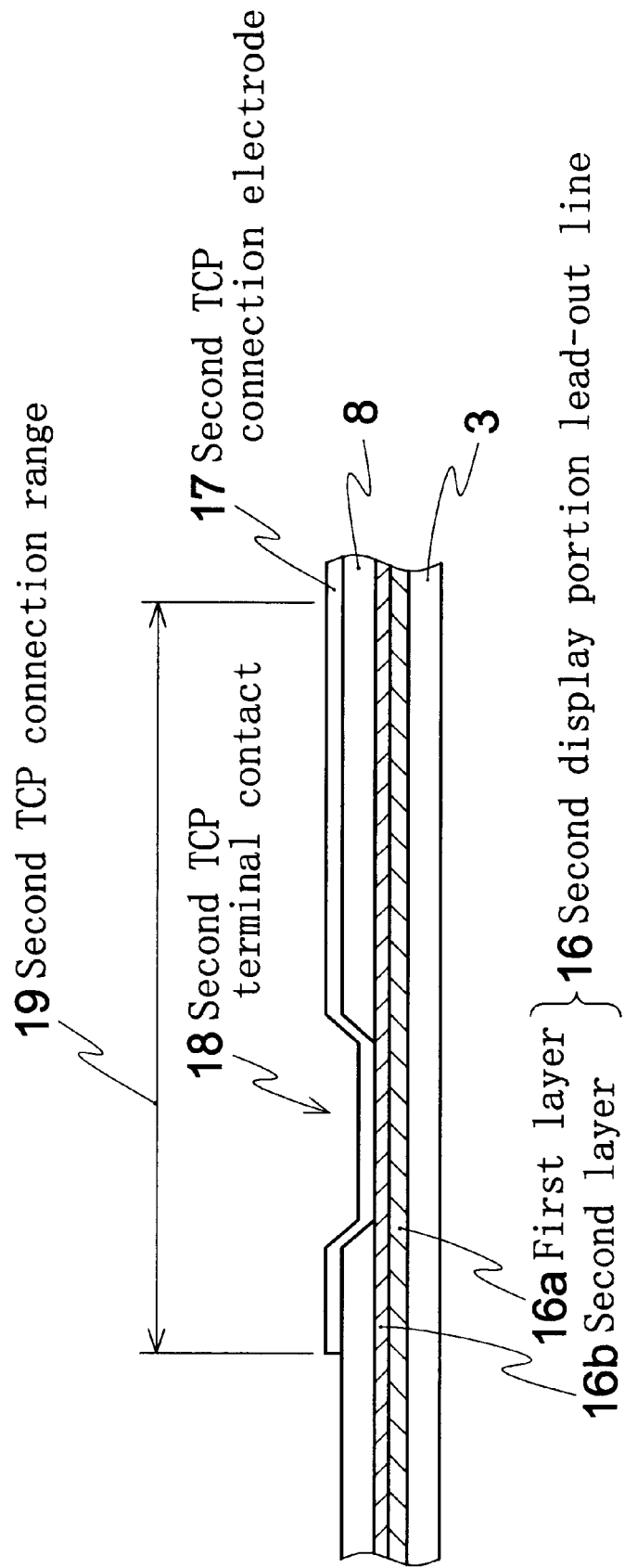
FIG. 5 is a cross-sectional view showing the cross section of the TCP terminal portion formed by the second metal thin film related to Embodiments 2 and 3 of the present invention.
Figure 6:
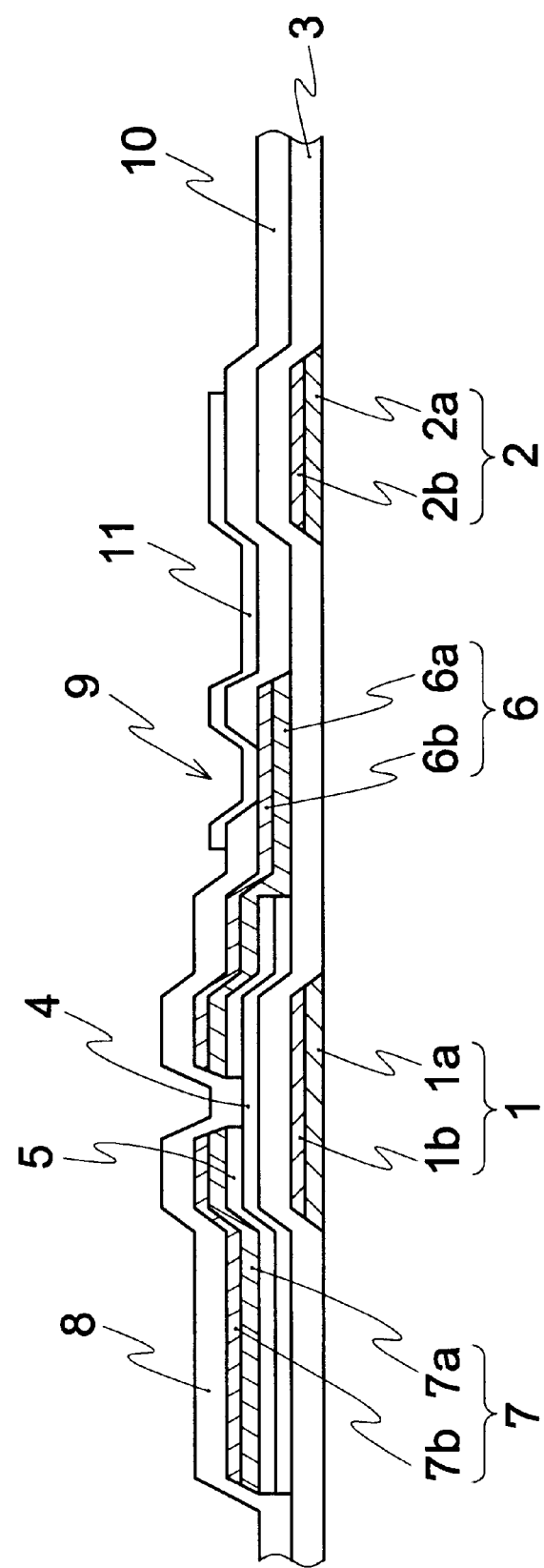
FIG. 6 is a cross-sectional view illustrating the main portion of the display pixel related to Embodiment 3 of the present invention.
Figure 7:
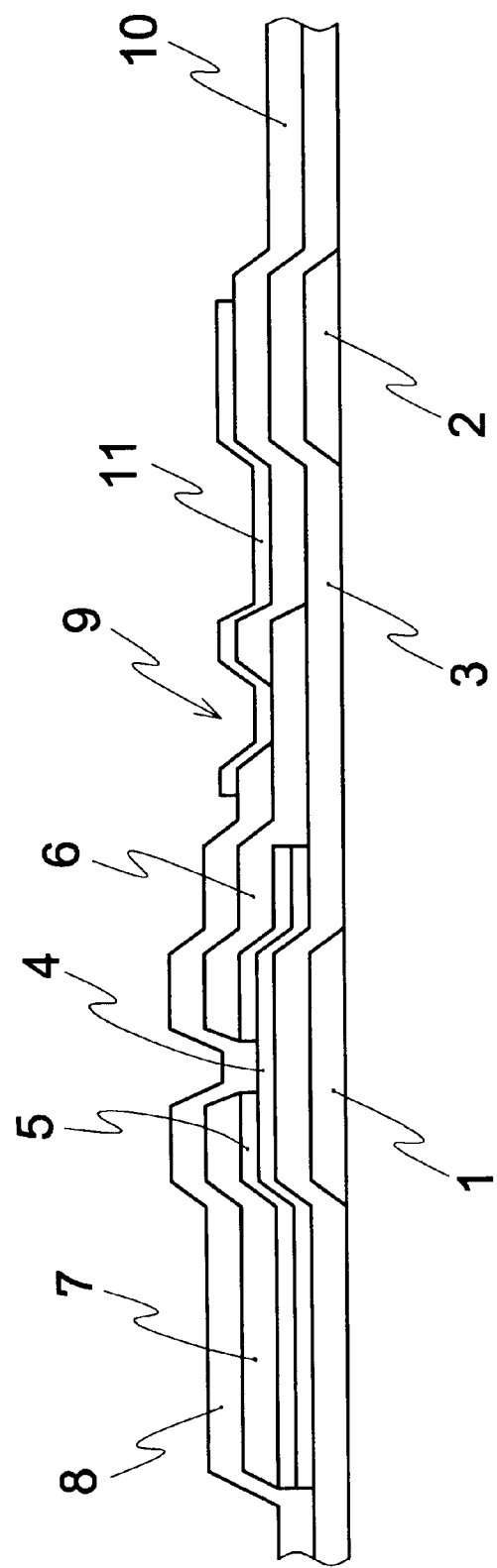
FIG. 7 is a cross-sectional view illustrating the main portion of the display pixel disclosed in Japanese Unexamined Patent Publication No.268353/1998.
Figure 8:
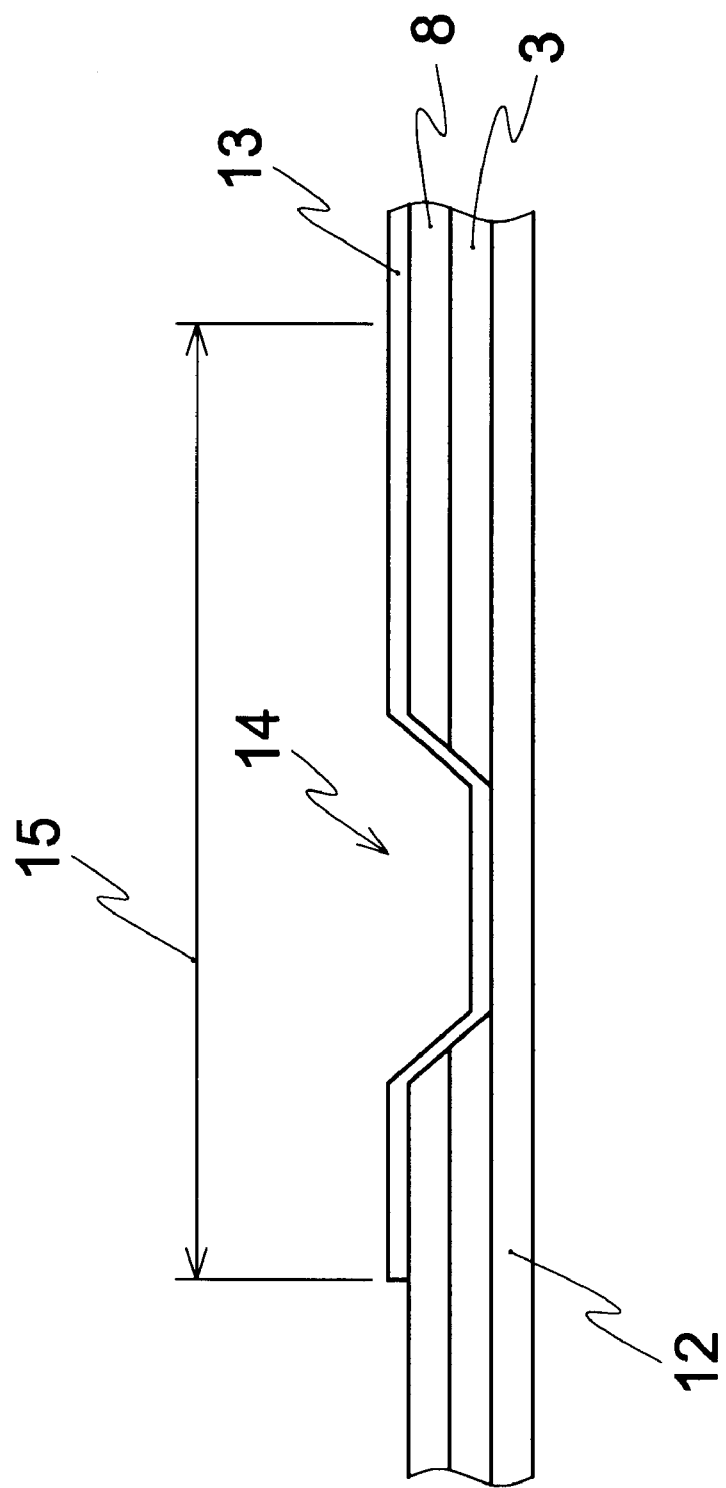
FIG. 8 is a cross-sectional view showing the cross section of the TCP terminal portion formed by the first metal thin film disclosed in Japanese Unexamined Patent Publication No. 268353/1998.
Figure 9:
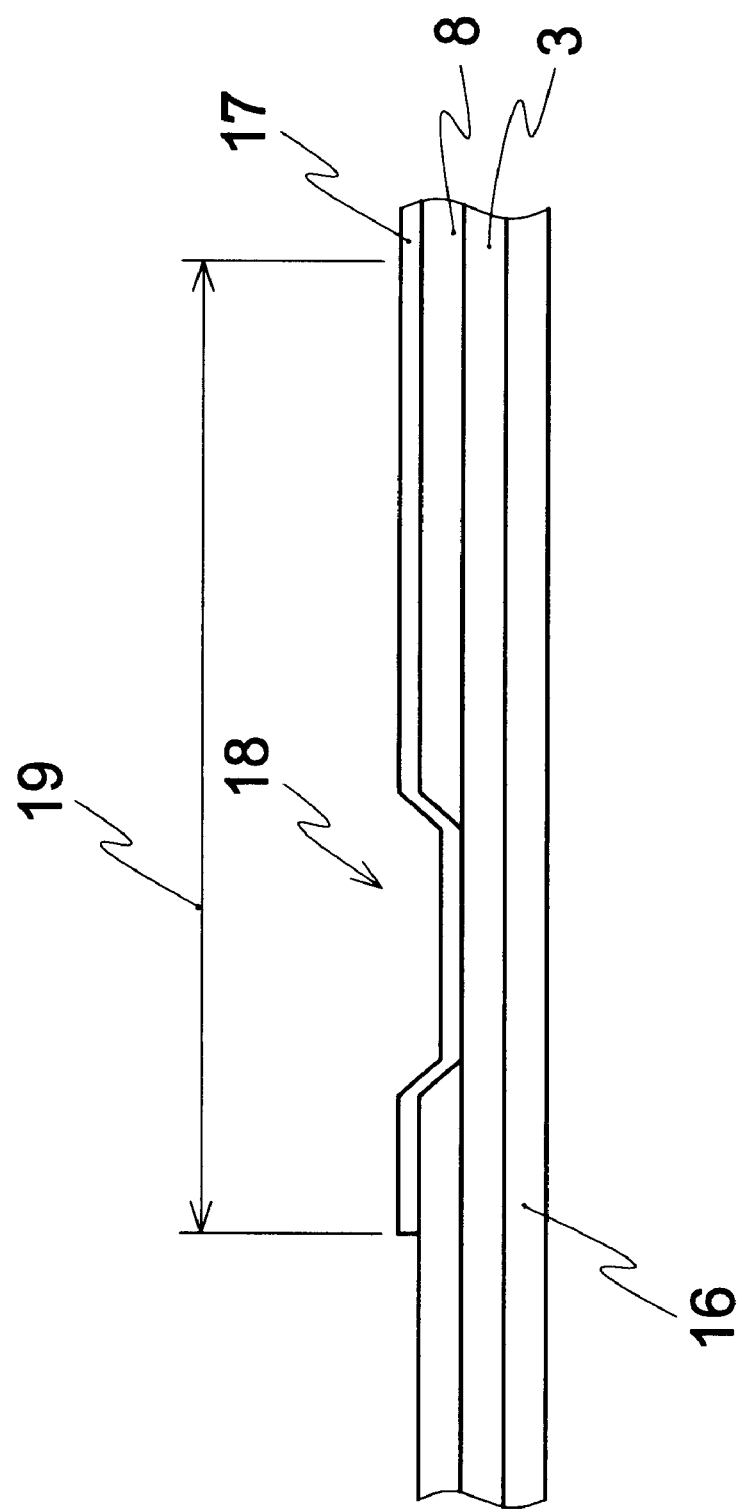
FIG. 9 is a cross-sectional view showing the cross section of the TCP terminal portion formed by the second metal thin film disclosed in Japanese Unexamined Patent Publication No. 268353/1998.

TFT Array Substrate In FIG. 3, a plan view illustrating the display pixel related to Embodiments 1 to 3 of the present invention is shown. The cross-sectional view of the TFT array substrate related to Embodiment 1 is shown in FIG. 1, Embodiment 2 in FIG. 4 and Embodiment 3 in FIG. 6. In FIG. 2, a cross-sectional view showing the cross section of the TCP terminal portion formed by the first metal thin film related to Embodiments 1 and 3 is shown. In FIG. 5, a cross-sectional view showing the cross section of the TCP terminal portion formed by the second metal thin film related to Embodiments 2 and 3 is shown.

As shown in FIG. 2, the TFT array substrate related to Embodiments 1 to 3 has a construction such that nitrogen atoms are contained in the vicinity of the interface of a first display portion lead-out line 12 (gate line) comprising a first metal thin film contacted to a first TCP contact part 14 comprising a display electrode material through a contact hole formed on the gate insulating film 3 and the passivation film 8. Alternatively, as shown in FIG. 5, it has a construction such that nitrogen atoms are contained in the vicinity of the interface of a second display portion lead-out line 16 (source line) comprising a second metal thin film contacted to a second TCP contact portion 18 comprising a display electrode material through a contact hole formed on the passivation film 8.

The TFT array substrate related to Embodiments 1 to 3 can be prepared according to a manufacturing process comprising the following five steps including photolithographic processes.

(a) First Photolithographic Process

At the beginning, a first metal thin film is formed on a first insulating substrate. Then the first metal thin film is patterned to form the gate line 21 and the gate electrode 1 of a TFT.

A glass substrate, a transparent glass substrate, a heat-resistant plastic substrate, a heat-resistant transparent plastic substrate and the like can be used as the insulating substrate.

Embodiments 1 and 3

In Embodiments 1 and 3, the first metal thin film comprises at least two layers of a first layer 1a, 2a and 12a comprising metal and a second layer 1b, 2b and 12b thereon obtained by adding nitrogen atoms on a metal. Therefore, in Embodiments 1 and 3 the first, lower layer 1a, 2a and 12a comprising metal is formed and then the second, upper layer 1b, 2b and 12b obtained by adding nitrogen atoms is formed. The first layer 1a, 2a and 12a and the second layer 1b, 2b and 12b are prepared according to a sputtering process and the like.

The metal of the first layer 1a, 2a and 12a can be one metal selected from the group consisting essentially of Al, Ta, W, Cu and Ag, or an alloy comprising at least one of these metals as a main component. The metal the second layer 1b, 2b and 12b to which nitrogen atoms are added can be a nitride of one metal selected from the group consisting essentially of Al, Ta, W, Cu and Ag, or a nitride of an alloy comprising at least one of these metals as a main component.

The film thickness of the first layer 1a, 2a and 12a can be determined to any value within the range where line resistance required for TFT-LCD is achieved. Generally, however, it is preferable to form the layer within a film thickness range of about 100 to 500 m (1,000 to 5,000 A). When the film thickness of the first layer 1a, 2a and 12a is small, step coverage of the gate insulating film 3 thereon against pattern difference on the first layer is improved but the total line resistance tends to increase. On the other hand, when the film thickness is large, the total line resistance is lowered but the step coverage of the gate insulating film 3 thereon tends to be deteriorated. Therefore, a countermeasure such as patterning the edges of the first layer into a tapered form is needed.

Preferably, the second layer 1b, 2b , and 12b is formed within a film thickness range of about 2 to 100 nm (20 to 1,000 Å). When the film thickness of the second layer 1b, 2b, and 12b is smaller than 2 nm, it becomes difficult to prepare a uniform film and there is a tendency that the effect of the present invention cannot be achieved sufficiently. On the other hand, since the above nitride of metal or alloy (for example, AlN alloy) has higher specific resistance than that of a non-nitride of metal or alloy (for example, Al alloy), the total resistance is increased when the film thickness is more than 100 nm, and there is a tendency that advantage of the low resistance material cannot be fully obtained.

For example, an Al alloy film can be formed in a thickness of 200 nm (2,000 Å) at first according to a sputtering method using pure Ar gas, and continuously, an AlN alloy film can be formed in a thickness of 20 nm (200 Å). The AlN alloy film can be formed according to a reactive sputtering method by introducing mixed gas of Ar and $N_2$ or a sputtering method using an AlN target. According to this method, the continuous film forming will improve efficiency of the treatment, and since the target is the alloy of Al alone, low expense can be realized.

Also useful as the process for preparing the AlN alloy film are a process for doping N according to ion injection method after Al alloy film is formed and a process for nitriding the Al alloy surface according to a plasma treatment by using $N_2$ gas.

Next, in the first photolithography process, the first metal thin film is patterned, and the gate electrode 1 of the TFT, gate line 21, the auxiliary capacity electrode 2, the auxiliary capacity line 20, and the first display portion lead-out line 12 are formed in the relevant profiles, respectively.

The photolithography process is carried out in order of the following steps (1) to (4). The steps are: (1) the TFT array substrate, i.e. the first insulating substrate on which the first metal thin film is formed is washed; (2) photosensitive resist is applied on the first metal thin film and dried, and then, exposed and developed through the mask pattern on which a specified pattern is formed to prepare photosensitive resist with the mask pattern transferred onto the TFT array substrate, i.e. the first metal thin film, photolithographically; (3) etching is carried out after curing the photosensitive resist by heating; and (4) the photosensitive resist is peeled.

When wettability between the photosensitive resist and the TFT array substrate, i.e. the first metal thin film, is not compatible and crawling is generated, countermeasures can be taken, such as UV cleaning before application of the photosensitive resist, or steam-applying of hexamethyl disilazan, HMDS or $(CH_3)_3Si—N=N—Si(CH_3)_3)$ for improvement of wettability. Also, in case where the adhesion between the photosensitive resist and the TFT array substrate, i.e. the first metal thin film, is poor and peeling occurs, elevation of curing temperature by heating, extension of time and other measures can be taken. Etching of the first metal thin film is carried out by wet etching using a known etchant comprising phosphoric acid, nitric acid and acetic acid when the film comprises an alloy of Al as in this embodiment.

Embodiment 2

In Embodiment 2, a thin film comprising one metal selected from the group consisting of Cr, Mo, Ta, Ti, Al, and Cu or an alloy containing at least one of these metals as a main component, i.e., an alloy obtained by adding traces of other substances to at least one of these metal, is used for the first metal thin film, which makes up the gate electrode 1, the gate line 21, the auxiliary capacity electrode 2 and the auxiliary capacity line 20, and the first display portion lead-out line 12. The first metal thin film is applied according to sputtering method or the like. The whole surface of the insulating substrate, for example a glass substrate, can be covered with this first metal thin film.

A thin film having a film thickness of about 100 to 500 nm (1,000 to 5,000 Å) is used as the first metal thin film. Small film thickness provides improvement of step coverage of the gate insulating film 3 thereon against pattern difference on the first metal thin film, but the total line resistance tends to increase. On the other hand, large film thickness causes decrease of the total line resistance, but the step coverage of the gate insulating film 3 thereon tends to deteriorate. Therefore, a countermeasure such as patterning the edges of the first metal thin film into a tapered form is necessary.

Since a contact hole is formed in the process later mentioned by dry etching on the first metal thin film, i.e., the first display portion lead-out line 12, and a conductive thin film which is to be the pixel electrode 11 is further formed, the first metal thin film is preferably a metal thin film having resistance to surface oxidation or which maintains conductivity even after oxidation. Preferably, the metal thin film comprises Cr, Mo or Ti. In addition, a metal thin film obtained by lamination of different kinds of metal thin films or a metal thin film which has a different composition in the film thickness direction can be used for the first metal thin film.

[(b) Second Photolithography Process]

Next, a first insulating film, i.e., the gate insulating film 3, the semiconductor active film 4 and the ohmic contact film 5, is formed. Then the semiconductor active film 4 and the ohmic contact film 5 are patterned by dry etching into a continuous shape larger than a portion in which the source line 22 and the TFT are formed in the second photolithography process.

The first insulating film, i.e., the gate insulating film 3, the semiconductor active film 4 and ohmic contact film 5, are formed continuously on an insulating substrate by plasma CVD method or the like.

As the first insulating film, i.e., the gate insulating film 3, $SiN_x$ film, $SiO_y$ film, $SiO_zN_w$ film or a laminated film thereof can be used. Each of x, y, z, and w is a positive number also in the followings.

The film thickness of the first insulating film is preferably 300 to 600 nm (3,000 to 6,000 Å. When the film thickness is small, short-circuiting is likely to occur at the intersecting portion between the gate line 21 and source line 21.

Therefore, the film thickness of the first insulating film 3 is preferably at least the film thickness of the first metal thin film which is to be the gate electrode 1, the gate line 21, the auxiliary capacity electrode 2, the auxiliary capacity line 20 and the first display portion lead-out line 12. When it is excessively large, ON current of TFT becomes small and display characteristics are degraded, and therefore, it is desirable to hold the film thickness as small as possible.

Examples of the semiconductor active film 4 include amorphous silicon (a-Si) film and polycrystalline silicon (p-Si) film. The thickness of the semiconductor active film 4 is preferably about 100 to 300 nm (1000 to 3000 Å). When the film thickness is small, loss of the ohmic contact film 5 during dry etching later mentioned occurs. When the film thickness is large, ON current of the TFT is decreased. Therefore, the film thickness is selected depending upon the ON current of the TFT, for which etching depth control is necessary at the time of dry-etching the ohmic contact film 5.

When an a-Si film is used for the semiconductor active film 4, it is preferable to form the interface of the gate insulating film 3 with the a-Si film by a $SiN_x$ film or a $SiO_zN_w$ film from the viewpoint of improving controllability of Vth of the TFT and reliability. When a p-Si film is used for the semiconductor active film 4, it is preferable to form the interface of the gate insulating film 3 with the p-Si film by a $SiO_y$ film or a $SiO_zN_w$ film from the viewpoint of improving controllability of Vth of the TFT and reliability.

When the a-Si film is used for the semiconductor active film 4, it is preferable to form the vicinity of the interface with the gate insulating film 3 under the conditions of small film-forming rate and the upper layer portion under the conditions of large film-forming rate. By forming films according to this kind of method, a TFT with large mobility can be obtained in a short film-forming time resulting in decrease of leak current when TFT current is OFF.

Examples of the ohmic contact film 5 include an $n^+$ a-Si film and an $n^+$p-Si film obtained by doping a trace of phosphorus to a-Si or p-Si. The film thickness of the ohmic contact film 5 is preferably from 20 to 70 nm (200 to 700 Å).

These films of $SiN_x$, $SiO_y$, $SiO_zN_w$, a-Si, p-Si, $n^+$ma-Si and $n^+$p-Si can be formed using a publicly known gas such as $SiH_4$, $NH_3$, $H_2$, $NO_2$, $PH_3$ or $N_2$, or a mixed gas thereof.

Then the semiconductor active film 4 and the ohmic contact film 5 are patterned and formed in the second photolithography process. The patterning is performed on the portion in which a display pixel TFT (hereinafter referred to as TFT portion) and the source line 22 (hereinafter referred to as source line portion) are formed, by using a pattern larger than the portion where the source line 22 and the TFT are formed so that a continuous shape can also be achieved. The semiconductor active film 4 and the ohmic contact film 5 are etched by dry etching using a known gas such as a mixed gas of $SF_6$ or $CF_4$ with HCl $Cl_2$, $O_2$ or He.

It has been explained that in this process, the semiconductor active film 4 and the ohmic contact film 5 are formed in a continuous shape on the portion in which the display pixel TFT and the source line 22 are formed. However, in this process, it is necessary to etch-remove the semiconductor active film 4 and the ohmic contact film 5 by etching from the second display portion lead-out line 12 through which the source line 22 is pulled out. The semiconductor active film 4 and the ohmic contact film 5 formed on the source line 22 are formed so that it crosses over a source-side lead-out line outside the display portion.

It is desirable that the shape of the portion of the semiconductor active film 4 and the ohmic contact film 5, which crosses over the source-side lead-out line is such that the end face length thereof is elongated. This shape prevents disconnection of the source line 22 at the only pattern difference of the semiconductor active film and ohmic contact film 23, which exists under the source line 22, for the area from the display portion to the portion where the TCP terminal is formed (a driver output connection terminal, hereinafter referred to as "TCP terminal portion"). When a second film is formed to cover a first film having a certain pattern, difference is generated on some part of the second film located on pattern edges of the first film. This difference is referred to as pattern difference.

It is also preferable to etch the edges of the semiconductor active film and ohmic contact film 23 into a tapered form since it prevents disconnection of the source line 22 at the only pattern difference of the semiconductor active film and ohmic contact film 23, which exists under the source line 22, for the area from the display portion to the TCP terminal portion.

[(c) Third Photolithography Process]

Next, a second metal thin film which is to be the source electrode 7, the source line 22, the drain electrode 6 and the display portion lead-out line 16, is formed. Then the source line 22, and the source electrode 7 and the drain electrode 6 of the TFT are patterned in the third photolithography process. A part of the ohmic contact film 5 which is protruded from the source line 22, the source electrode 7 and the drain electrode 6 is etch-removed by dry etching.

Embodiment 1

In Embodiment 1, a metal thin film comprising one metal selected from the group consisting essentially of Cr, Mo, Ta, Ti, Al and Cu, or an alloy comprising at least one of these metals as a main component, i.e., an alloy obtained by adding traces of other substances to at least one of these metals, can be used as the second metal thin film. The second metal thin film is applied according to sputtering method or the like. The whole surface of the insulating substrate is covered with this second metal thin film.

A thin film having a film thickness of about 100 to 500 nm (1,000 to 5,000 Å) is used as the second metal thin film. Small film thickness of the second metal thin film provides improvement of step coverage of the passivation film 8 thereon against pattern difference on the second metal thin film, but the total line resistance tends to increase. On the other hand, large film thickness causes decrease of the total line resistance, but the step coverage of the passivation film 8 thereon tends to deteriorate. Therefore, a countermeasure such as patterning the edges of the second metal thin film into a tapered form is necessary.

A contact hole is formed in the process later mentioned by dry etching on the second metal thin film, i.e., the drain electrode 6 and the second display portion lead-out line 16, and a conductive thin film which is to be the pixel electrode 11 or the second TCP connection electrode is further formed. Therefore, the second metal thin film is preferably a metal thin film having resistance to surface oxidation or which maintains conductivity even after oxidation. Preferably, the metal thin film comprises at least Cr, Mo or Ti.

It is preferable when at least the interface of the metal thin film with the ohmic contact film 5 comprises Cr, Mo or Ti since excellent contact characteristic against the ohmic contact film 5 can be achieved. In addition, a metal thin film obtained by lamination of different kinds of metal thin films or a metal thin film which has a different composition in the film thickness direction can be used as the second metal thin film.

Then, in the third photolithography process, the second metal thin film is patterned into the shape of the source electrode 7, the source line 22, the drain electrode 6 and the second display portion lead-out line 16 of the TFT. In addition, a part of the ohmic contact film which is protruded from the source line 22, the source electrode 7, and the drain electrode 6 is ecth-removed to form a TFT channel of the pixel portion.

Etching of the second metal thin film is carried out by wet etching using publicly known etchant, for example, an aqueous solution obtained by mixing ceric nitrate anmonium and nitric acid are mixed if the second metal thin film comprises Cr. It is preferable to etch the edges of the second thin metal film into a tapered form since it prevents disconnection of an electrode pattern comprising a conductive thin film formed thereon.

Etching of the ohmic contact film 5 can be performed by dry etching using publicly known gas such as mixed gas of $SF_6$ or $CF_4$ with HCl, $Cl_2$, $O_2$ or He. In the etching of the ohmic contact film 5, the depth of the etching is controlled to the extent that at least the ohmic contact film 5 is removed without losing the semiconductor active film 4 located thereunder. It is desirable to leave the lower semiconductor active film 4 as thick as possible from the viewpoint of obtaining a TFT having large mobility.

Embodiments 2 and 3

In Embodiments 2 and 3, the second metal thin film comprises at least two layers of a first layer 6a, 7a and 16a comprising metal and a second layer 6b, 7b and 16b thereon obtained by adding nitrogen atoms on a metal. Therefore, in Embodiments 2 and 3 the first, lower layer 6a, 7a and 16a comprising metal is formed and then the second, upper layer 6b, 7b and 16b obtained by adding nitrogen atoms is formed. The first layer 6a, 7a and 16a and the second layer 6b, 7b and 16b are prepared according to sputtering process and the like.

The metal of the first layer 6a, 7a and 16a can be one metal selected from the group consisting of Al, Ta, W, Cu and Ag, or an alloy comprising at least one of these metals as a main component. The second layer 6b, 7b and 16b comprising the metal to which nitrogen atoms are added can be a nitride of one metal selected from the group consisting of Al, Ta, W, Cu and Ag, or a nitride of an alloy comprising at least one of these metals as a main component.

The film thickness of the first layer 6a, 7a and 16a can be determined to any value within the range where line resistance required for TFT-LCD is achieved. Generally, however, it is preferable to form the layer within a film thickness range of about 100 to 500 nm (1,000 to 5,000 Å). When the film thickness of the first layer 6a, 7a and 16a is small, step coverage of the passivation film 8 thereon against pattern difference on the first layer is improved but the total line resistance tends to increase. On the other hand, when the film thickness is large, the total line resistance is lowered but the step coverage of the passivation film 8 thereon tends to be deteriorated. Therefore, a countermeasure such as patterning the edges of the first layer into a tapered form is necessary.

Preferably, the second layer is formed within a film thickness range of about 2 to 100 nm (20 to 1,000 Å). When the film thickness of the second layer is smaller than 2 nm, it becomes difficult to prepare a uniform film and there is a tendency that the effect of the present invention cannot be achieved sufficiently. On the other hand, since the above nitride of metal or alloy (for example, AlN alloy) has higher specific resistance than that of a non-nitride of metal or alloy (for example, Al alloy), the total resistance is increased when the film thickness is more than 100 nm, and there is a tendency that advantage of the low resistance material cannot be fully obtained.

For example, an Al alloy film is formed as a lower layer in a thickness of 200 nm (2,000 Å) according to sputtering method, and then, an AlN alloy film is formed as an upper layer in a thickness of 20/nm (200 Å). The AlN alloy film can be formed according to reactive sputtering method using mixed gas of Ar and $N_2$, sputtering method using an AlN target or the like. At first, the Al alloy film is formed in a thickness of 200 nm by using pure Ar gas, and continuously, the AlN alloy film is formed in a thickness of 20 nm according to reactive sputtering method by introducing mixed gas of Ar and $N_2$. According to this method, the continuous film forming will improve efficiency of the treatment, and since the target is the Al alloy alone, low expense can be realized.

When an Al alloy is used for the second metal thin film, i.e., the source electrode 7, the source line 22, the drain electrode 6 and the display portion lead-out line 16, it sometimes becomes difficult to obtain excellent electric contact between the film and the ohmic contact film 5 thereunder. In such a case, it is preferable to form a film of metal having high melting point, such as Cr, Ti and Ta in the range of about 10 to 200 nm under the Al alloy.

According to these steps, a TFT array substrate is formed through five steps each of which includes a photolithography process. As shown in FIG. 5, the TFT array substrate has a construction such that nitrogen atoms are contained in the vicinity of the interface between the above second metal thin film, i.e. the second display portion lead-out line 16, and the second TCP terminal contact 18 comprising a pixel electrode material, namely, a construction of a second layer obtained by adding nitrogen atom/element, through a contact hole made on the passivation film 8.

(d) Fourth Photolithography Process

Next, a second insulating film which is to be the passivation film 8, is formed. Then the first and second insulating films are patterned in the fourth photolithography process to form a pixel contact hole 9 reaching at least the drain electrode 6 surface and a second contact hole reaching at least the second metal thin film, i.e., the second display lead-line, surface.

The second insulating film can be formed by the plasma CVD process. Examples of the second insulating film include $SiN_x$ film, $SiO_y$ film, and $SiO_zN_w$ film. The film thickness of the second insulating film may be at least about 200 nm (2000 Å). In case of using an excessively thick film, there is a deficit that photosensitive resist is removed during dry etching of the contact hole which is mentioned later. Therefore, the film thickness should be selected depending upon the combination of resist during the dry-etching of the contact hole and the second insulating film.

When the film thickness is excessively large, disconnection is found due to pattern difference at the electrodes formed by a conductive thin film on the contact hole, namely, the pixel electrode 11 and the second TCP connection electrode 17. Therefore, the upper limit of the film thickness is determined depending on step coverage of the conductive thin film. The step coverage means quality of film covering condition at fine pattern difference on a surface. Preferably, the film thickness is about 200 to 600 nm (2,000 to 6,000 Å) from the viewpoint of productivity, step coverage of the conductive thin film, combination between resist and dry etching which is performed to form a contact hole on the second insulating film, and the like.

Next, in the fourth photolithography process, the second insulating film and the first insulating film, namely the gate insulating film 3, are patterned to form contact holes. The contact holes to be formed are the pixel contact hole 16 reaching the surface of the drain electrode 6, the first TCP terminal contact 14, namely the first contact hole reaching the surface of the first metal thin film, i.e., the first display portion lead-out line 12, and the second TCP terminal contact 18, namely the second contact hole reaching the surface of the second metal thin film, i.e., the second display portion lead-out line 16.

The etching of the second insulating film and the first insulating film, namely the gate insulating film 3, are carried out by dry etching using known gas such as mixed gas of $SF_6$ and $O_2$ or mixed gas of $CF_4$ and $O_2$).

It was described that the pixel contact hole 9, the first TCP terminal contact 14, and the second TCP terminal contact 18 are formed in this process, but in addition to these, any contact hole necessary for manufacturing a TFT array substrate may be formed. Examples are a contact hole positioned at the part where transfer terminals (hereinafter referred to as "transfer terminal portion") are formed in order to connect the opposite substrate and the TFT array substrate electrically using a resin containing conductive particles.

In case of forming the pixel contact hole 9 and the second TCP terminal contact 18, the second insulating film is removed by etching, and in case of forming the first TCP terminal contact 14, the second insulating film and the first insulating film, i.e., the gate insulating film 3, is removed by etching. Therefore, the second metal thin film surfaces at the pixel contact hole 9 and the second TCP terminal contact 18, namely the drain electrode 6 and the second display portion lead-out line 16, respectively, are particularly exposed to plasma for dry etching for a long time.

When the metal thin film surfaces, namely the drain electrode 6 and the second display portion lead-out line 16, are exposed to the plasma for dry etching for a long time, and if there exists, among the plasma, any sort of plasma which functions to etch or oxidize the metal thin film, namely the drain electrode 6 and the second display portion lead-out line 16, electric resistance between the metal thin film and each conductive thin film thereon at the contact holes increases. Therefore, it is necessary to select kind of materials for the second metal thin film, namely the drain electrode 6 and the second display portion lead-out line 16, and kind of gas in dry etching.

When the surfaces of the metal thin film, namely the drain electrode 6 and the second display portion lead-out line 16, are exposed in the plasma state during dry etching for a long time, there is a case where deposits produced by a polymerization reaction of the gas (hereinafter referred to as "deposits") may adhere. In this case, it is preferable to remove the deposits by ashing according to the plasma using $O_2$ gas. By removing the deposits, satisfactory contact characteristics can be achieved between the metal thin film and each conductive thin film thereon at the contact holes.

The conditions of the gas kind in etching described above can be applied similarly to the first TCP terminal contact 14, though there is a difference in some degree. In addition, the pattern edges are preferably formed into a taper shape from the viewpoint of preventing disconnection of electrode formed by a conductive thin film on the contact hole at pattern difference.

[(e) Fifth Photolithography Process]

Next, a transparent, conductive thin film which is to be the pixel electrode 11, the first TCP connection electrode 13 and the second TCP connection electrode 17, is formed. Then patterning was performed to form the pixel electrode 11, the first TCP connection electrode 13 and the second TCP connection electrode 17.

When the electrodes are formed by a transmission type electro-optic element is formed, a transparent conductive film ITO (indium tin oxide), $SnO_2$ or a mixed ITO film thereof comprising $In_2O_3$ and $SnO_2$ can be used as the conductive thin film, the ITO being preferable from the viewpoint of chemical stability. The conductive thin film can be formed according to sputtering process and the like. In case of the transmission type electro-optic element, the film thickness of the transparent, conductive thin film is preferably selected within the range of about 50 to 200 nm (500 to 2,000 Å) to prevent coloring caused by interference also on the opposite substrate when light comes in.

Next, in the fifth photolithography process, resist is patterned into the shapes of the pixel electrode 11, the first TCP connection electrode 13 and the second TCP connection electrode 17, and the conductive thin film is patterned into the shapes of the pixel electrode 11, the first TCP connecting electrode 13 and the second TCP connecting electrode 17.

Etching of the conductive thin film is performed by wet-etching using a known etchant such as an aqueous solution obtained by mixing hydrochloric acid with nitric acid in case of using an ITO conductive thin film, depending on the film material. When the conductive thin film is ITO, it is possible to etch by dry etching using known gas such as $CH_4$.

It has been discussed that the pixel electrode 11, the first TCP connection electrode 13 and the second TCP connection electrode 17 are formed in this process. However, it is also possible, for example, to form electrodes comprising a conductive thin film at a transfer terminal portion which electrically connects an opposite substrate and a TFT array substrate using a resin containing conductive particles.

A conductive thin film, especially an ITO film, which is to be the pixel electrode 11, the first TCP connection electrode 13 and the second TCP connection electrode 17 is preferably formed in an amorphous condition. For example, an amorphous ITO film can be formed according to sputtering process or the like by introducing gas obtained by adding $H_2O$ or $H_2$ gas to a conventional mixed gas of Ar and $O_2$ for sputtering. The film thickness is preferably 50 to 200 nm in the same reason as mentioned above.

When an amorphous, conductive thin film is used to form the pixel electrode 11, a TFT array substrate shown in FIGS. 1 to 6 can be manufactured by etching a conductive thin film such as an amorphous ITO film using, for example, an oxalic acid etchant. Unlike a conventional, known etchant comprising hydrochloric acid and nitric acid or the like, the oxalic acid etchant does not erode Al alloy. Accordingly, in case of using Al alloy as the first TCP connection electrode 13 and the second TCP connection electrode 17, there is an advantage that inferior properties caused by erosion of Al can be prevented at etching of an amorphous ITO film even if defects or pinholes are present on a film interposed between layers.

The second metal thin film comprises a first layer of metal, for example, Al alloy layer, and a second layer thereon obtained by adding nitrogen atoms to metal, for example, AlN layer, with a high melting point metal, for example, Cr, under the two layers. In this construction, the conventional, known etchant comprising hydrochloric acid and nitric acid causes electrochemical reaction and the Cr layer is extremely eroded thereby if there is any defect or pinhole on a film between layers. On the other hand, the oxalic acid etchant can prevent inferior properties from appearing since Cr or Al alloy is not eroded.

However, the amorphous ITO film also has a disadvantage of poor resistance against other chemicals even though the film is easy to be etched the film by using a weak oxalate acid etchant. Therefore, once the above TFT array substrate is prepared, it is preferable to perform annealing and crystallization at a temperature higher than the crystallization temperature of the amorphous ITO to complete preparing the TFT array substrate. The crystallization brings about achievement of chamical resistance improvement in addition to transmittivity increase and reduction of specific resistance. As a result, a highly reliable TFT array substrate can be manufactured.

A film of $In_2O_3$ or ZnO other than amorphous ITO can also be used as the transparent, conductive material which can be etched with a weak acid etchant such as the weak oxalate acid etchant. The $In_2O_3$ film and the ZnO film are advantageous in that an amorphous film can be formed using conventional mixed gas of Ar and $O_2$ in sputtering while $H_2$ gas or $H_2O$ is introduced in case of using an ITO film.

The above Embodiments illustrate examples of the transmission type TFT array substrate having a transparent, conductive film such as an ITO as the pixel electrode 11, but the TFT array substrate is not limited thereto. The effect of the present invention that excellent contact resistance is achieved can be also seen even when a reflection type TFT substrate having a metal material as the pixel electrode 11 is used, in case where electric contact is achieved by using a transparent, conductive film such as ITO for TCP connection electrodes.

As well as TFT array substrates, an element having a part where a transparent, conductive film is electrically connected with a metal film can bring about the effect of the present invention in the same way.

Opposite Substrate The opposite substrate comprises a color filter, black matrix and a common electrode mounted on a second insulating substrate. A transparent glass substrate, a transparent plastic substrate and the like can be used as the second insulating substrate. The color filter is formed by, for example, application of color resist of red (R), green (G) and blue (B), or transcription of a color film, and is patterned into a pre-determined arrangement according to a photolithography method.

The black matrix can be prepared by patterning a metal having low reflectance such as Cr or a Cr oxide, a black resin or the like onto a pre-determined shaded area such as a border or periphery of each pixel of the color filter. The common electrode is obtained by forming a transparent conductive film comprising an oxide of $In_2O_3$, $SnO_2$ or ZnO, or a mixed oxide thereof according a sputtering method.

Formation of Liquid Crystal Panel (Electro-Optic Element)

The TFT array substrate manufactured through the above five processes and the opposite substrate are combined according to a known technique. Liquid crystal is interposed and sealed between the TFT array substrate and the opposite substrate to manufacture a TFT-LCD.

First of all, using a known technique, an alignment control film for liquid crystal is formed on each surface of the TFT array substrate and the opposite substrate. A polyimide film can be used as one of the examples of the alignment control films. For example, after polyimide liquid is applied and dried to form a polyimide film, the surface undergoes rubbing treatment by using cloth, and the film is used as the alignment controlling film. The thickness of the alignment controlling film may range from about a super-thin film thickness of one molecule which composes the alignment controlling film, to about 100 nm. When the alignment controlling film is thick, the effective voltage applied to a liquid crystal layer is small out of the effective voltage applied across the pixel electrode of the TFT array substrate and the common electrode of the opposite substrate. Therefore, thin film forming is preferably performed within a film thickness range practical in the processes.

The alignment controlling film is formed so as not only to align a director of the liquid crystal to the substrate direction by rubbing but also to align with a so-called pretilt angle of about 30° to 15° (angle formed between the liquid crystal particles and the substrate). An excessively small pretilt angle causes a so-called domain (zone under alignment state) accompanied by disclination, which means a discontinuous liquid crystal alignment, that is, discontinuous director at a border or a discontinuous structure caused by electric fields generated around the pixel electrode and across the source line, the gate line, and the auxiliary capacity line on the TFT array substrate. Generation of the domain at a light transmitting area gives rise to lowering of display properties, such as contrast decrease. Therefore, a pretilt angle is properly adjusted in accordance with domain generation possibility of each liquid crystal material used.

The pretilt angle can be controlled depending upon the alignment controlling film material used or conditions such as intensity of alignment treatment including rubbing. When the pretilt angle is large, stable alignment control tends to be difficult. It is preferable to control the pretilt angle within the above-mentioned range, that is, about 3° to 15°.

Due to difference of dVgd caused by the display signal, DC potential is generated between the TFT array substrate and the common electrodes of the opposite substrate. It is preferable to select a material which hardly causes poring or absorption of impurities in the liquid crystal from the viewpoint that image tricking of the display part is unlikely to occur. It is conventionally known that such a material can be obtained by thin film forming of an alignment controlling film or by reducing resistance in plane direction of an alignment controlling film. The alignment controlling film material is applied to the substrate by transferring, spinner, namely, application using spin (spin coating), or the like.

Next, a material which serves as spacer is sprinkled on at least either one of the TFT array substrate or the opposite substrate in order to affix the TFT array substrate to the opposite substrate with maintaining specified clearance therebetween. Since the TFT or the lines on the TFT array substrate is damaged if the spacer has high hardness and acute profile when the TFT array substrate is affixed to the opposite substrate with a specified clearance provided, the material for spacer is selected in consideration of these facts. For example, particles of polystyrene or $SiO_2$ can be used for spacer.

With respect to the spacer sprinkling density, excessively high sprinkling density disturbs liquid crystal alignment condition around the spacer, and therefore, contrast is decreased or air bubbles may be generated on the display part when the liquid crystal volume is reduced at a low temperature. When the spacer sprinkling density is excessively small, distribution is generated within a face on the display due to clearance between the TFT array substrate and the opposite substrate, and therefore, there arises unevenness in brightness. Because of such restrictions, the spacer sprinkling density is selected in accordance with the hardness of the spacer used. Spacer can be applied by sprinkling a solution obtained by dispersing the spacer in a volatile solvent, for example, ethanol.

Next, a sealing material comprising, for example, an epoxy resin is formed like a seal around the display part on either of the TFT array substrate or the opposite substrate. When the above-mentioned spacer is also contained in the sealing material by uniform application, it is possible to accurately control the clearance between the TFT array substrate and the opposite substrate. Useful as spacer contained in the sealing material are the ones whose material and particle size are different from those of the sealing material applied within the substrate face.

In order to inject liquid crystal to the clearance between the TFT array substrate and the opposite substrate by vacuum injection method later described, a sealing material is formed on either of the substrates. However, it is necessary to make a notch which functions as an injection part for the liquid crystal in at least one place within the profile pattern indicating the region to be formed. When liquid crystal is introduced according to a known technique other than the vacuum injection method, a notch for the seal part is not required. For the formation of a seal profile, screen printing, drawing by a syringe (a method for discharging a sealing material by a syringe to draw a seal profile) and the like can be used.

Next, a transfer material having conductivity is applied onto either of the TFT array substrate or opposite substrate, at the position of the transfer electrode formed on the TFT array substrate. This transfer electrode is an electrode terminal for introducing a common electrode potential to the common electrode of the opposite substrate. As the transfer material, a material obtained by dispersing conductive particles in an epoxy resin or the like can be used. Screen printing, drawing by a syringe and the like can be used in application of the transfer material. Also, at least one transfer electrode is necessary. In order to obtain a uniform display it is preferable to reduce impedance against the common electrode of the opposite substrate from signal source of common electrode potential. Therefore, it is preferable to position transfer electrodes at four corners of the display part, or a plurality of transfer electrodes around the display portion excluding the gate-side lead-out line and source-side lead-out line.

Next, the TFT array substrate and the opposite substrate are affixed to each other. When they are affixed, it is preferable to take some steps so as to maintain pre-determined accuracy of the lamination before pressurization and heating for curing the sealing material and the transfer material. Examples of the steps are 1) applying a UV curable resin onto the end faces of the laminated substrates to cure the UV material by UV irradiation after lamination of the TFT array substrate and the opposite substrate; 2) applying a UV curable resin onto a portion excluding the display part by a syringe or the like, followed by lamination of the TFT array substrate and the opposite substrate, a UV material being cured by UV irradiation thereafter; and the like. After such a treatment, with pressurizing the TFT array substrate and the opposite substrate in a pre-determined accuracy, the sealing material and transfer material are cured by heating.

Then portions of laminated TFT array substrate and opposite substrate unnecessary for the electro-optic element is cut away, the TCP connecting terminal portion is brought to the surface and an injection part for liquid crystal is formed to make empty cells.

The empty cell is introduced to a vacuum, and after evacuating the empty cell, it is open to the atmosphere with the injection part being immersed in the liquid crystal to inject the liquid crystal into the empty cell. In this process, when the atmosphere where the empty cell is placed is evacuated too fast, the cell expands due to the air remaining in the empty cell, possibly causing seal puncture. Therefore, it is preferable to evacuate the cell at a suitable speed. Also, when the injection part is immersed into the liquid crystal and the atmosphere where the empty cell is placed is suddenly released to the air atmosphere, atmospheric pressure is applied to the empty cell, and the spacer may deform or the substrate surface may be damaged by the spacer. Therefore, it is preferable to release the cell at a suitable speed.

Next, a sealing material comprising an epoxy resin or UV curable resin is applied to the injection part and is cured to prepare a liquid crystal display. It is also possible to maintain uniform clearance between the TNT array substrate and the opposite substrate by pressurizing the cell to which the liquid crystal has been injected before applying the sealing material.

After that, polarizers whose polarization axis is adjusted to a specified angle are affixed on the top and at the bottom of the sealed cell. The specified- angle refers to, for example, an angle formed by intersecting the polarization axis of the top polarizer and the polarization axis of the bottom polarizer at right angles, each polarization axis being in parallel to or intersected at right angles with the direction of liquid crystal director on the attached substrate. This is the case of normally white mode display during which transmissivity becomes small if large effective voltage is applied to the liquid crystal layer using, for example, TN liquid crystal. In particular, an angle formed by intersecting the director on the attached substrate with the polarization axis at right angles is preferable since it can reduce change of characteristics due to an angle of visibility.

In addition, a known film which can improve dependency of angle of visibility of an electro-optic element can be laminated on polarizers. Or polarizers obtained by laminating these films can be used. When TN type liquid crystal is used for liquid crystal, alignment treatment is carried out so that each liquid crystal director on the upper substrate and the lower substrate intersects at right angles with each other. However, the polarization axis of the polarizer is directed in parallel to or is intersected at right angles with the director direction of the attached substrate surface. In order to obtain a display with high contrast, it is preferable to provide a configuration such that the top polarization axis and the bottom polarization axis intersect with each other at right angles to prevent light permeation when voltage is applied to the liquid crystal.

Now, by electrically probing the TCP terminal portions of liquid crystal display panels and performing display, the display characteristics were inspected to remove any liquid crystal panel which does not provide a specified property. According to this, the subsequent processes can be carried out more efficiently and materials to be used can be reduced.

Efficient manufacture of liquid crystal display panels can be achieved by manufacturing liquid crystal display panels with a plurality of display elements formed on the same substrate within a physically possible range. Also, it is possible to carry out inspection of display characteristics of liquid crystal display panel before affixing polalizers. In this case, the inspection is carried out by separately placing the polarizers on the top and at the bottom of the sealed cell, and any liquid crystal display panel does not show specified properties will not be sent to the subsequent processes, thereby enabling to save polarizers to be used. In addition, the above order of the steps for manufacturing liquid display panel may be replaced within a physically possible range. Then, a TCP is bonded to the TCP output terminal connection portion of the liquid crystal panel by using an anisotropic conductive film (ACF). Construction of the TCP driver output terminal is either (1) construction in which a first metal thin film is laminated with a first insulating film, a second insulating film and a conductive thin film, wherein the first metal thin film and the conductive thin film are electrically connected by means of a contact hole which is formed in the first and the second insulating film to reach the first metal thin film by the fourth photolithography process, or (2) a construction in which a first insulating film, a second metal thin film, a second insulating film and a conductive thin film are laminated, wherein the second metal thin film and the conductive thin film are electrically connected by means of a contact hole which is formed in the second insulating film to reach the second metal thin film surface by the fourth photolithography process, and at the same time, the contact hole of the driver output connection terminal portion of TCP is covered with ACF.

The ACF is a film which connects the TCP with the driver output connecting terminal of the TCP. Examples of ACF are those obtained by dispersing conductive particles in a thermosetting or thermoplastic resin. In this event, the ACF is placed at the position where the first TCP terminal contact and the second TCP terminal contact are completely covered, that is, the position of the first TCP connecting range and the second TCP connecting range. By covering level difference at the contact holes of the TCP terminal portions with ACF, corrosion by humidity can be prevented even when a crack and the like are generated on the conductive thin film at the level difference portion since the display portion lead-out electrode is no longer exposed to humidity in the atmosphere.

The first TCP connecting electrode and the second TCP connecting electrode of the TCP terminal portion are not indispensable for electro-optic apparatus. When no inspection is required or when the first metal thin film surface and the second metal thin film surface are inspected using a probing technique having high electric reliability, it is possible to omit the first TCP connecting electrode and the second TCP connecting electrode. In this case, it is preferable to extend the first TCP terminal contact and the second TCP terminal contact to the maximum within a range where the ACF is disposed because contact resistance with TCP can be reduced without exposure to the atmosphere.

Next, according to a known technique, TCP is connected to a drive circuit substrate by means of, for example, ACF or soldering, and in addition, other necessary control circuit substrates, connectors with external signal, a backlight system and a box are mounted to manufacture an electro-optic element.

As shown in Example 1 to 3,there were less contact resistance between the second metal thin film and the transparent, conductive film when a second metal layer comprising a metal having nitrogen atoms are used for the second metal thin film, i.e., the gate line, the source line or the both, than that when no second metal layer was used.

EXAMPLE 1

In Example 1 corresponding to Embodiment 1,the second metal layer was used for the gate line, and four contact holes of 30 $\mu$m □ were disposed at the gate line terminal portion. Contact resistance between the gate line and the transparent electrode at the gate line terminal portion turned out to be about 100Ω. On the other hand, when no second metal layer was used, contact resistance between the same was about 100 kΩ. Display was normally performed when the second metal layer was used, but when it was not used, the TFT- LCD module had a large gate line delay and there was a display defect such that black display was lost to be white at normally white mode.

EXAMPLE 2

In Example 2 corresponding to Embodiment 2, the second metal layer was used for the source line, and four contact holes of 30 μm □ were disposed at the source line terminal portion. Contact resistance between the source line and the transparent electrode at the source line terminal portion turned out to be about 100Ω. On the other hand, when no second metal layer was used, contact resistance between the same was about 100 kΩ. Display was normally performed when the second metal layer was used, but when it was not used, the TFT-LCD module had a defect that brightness inclination is found at black display in the direction of the source line, and contrast was remarkably reduced at the lower part of the module. This is because resistance at source connecting terminal was large and because writing characteristics was damaged due to signal delay at the lower module.

EXAMPLE 3

In Example 3 corresponding to Embodiment 3, a second metal layer was used for the gate line and the source line, and four contact holes of 30 μ□ were disposed. Contact resistance between the gate line or the source line and the transparent electrode turned out to be about 100 ΩQ and then, not only display was performed normally but also the contrast 250 of Example 2 improved to about 300 since a material having a low resistance could be used for the both of the gate line and the source line.

As mentioned above, the electro-optic device, namely the TFT-LCD manufactured according to the present invention succeeded in remarkably improving characteristics of electric contact resistance between a transparent electrode and metal lines, and display properties compared to the case of using a conventional electro-optic device to which the present invention is not applied.

According to the first to eighteenth methods for manufacturing the electro-optic element of the present invention, a line material having low resistance comprising either a metal such as Al, Mo, W, Cu or Ag, or an alloy of these metals can be used for the first metal thin film, i.e., the gate electrode 1, the gate line 21, and the second metal thin film, i.e., the source electrode 7, the source line 22 and the drain electrode 6. Also, contact resistance of electric connection between the first metal thin film, i.e., the gate electrode 1, the gate line 21, or the second metal thin film, i.e., the source electrode 7, the source line 22 and the drain electrode 6, and the transparent, conductive metal thin film which forms the pixel electrode can be maintained low.

Also, since a material having low resistance comprising either a metal such as Al, Mo, W, Cu or Ag, or an alloy of these metals can be used for the first metal thin film, i.e., the gate electrode 1, the gate line 21, and the second metal thin film, i.e., the source electrode 7, the source line 22 and the drain electrode 6, large-scale display screens can be prepared while array substrates can be formed into thin films. When the array substrate is made thin, height of pattern difference on the array substrate becomes low and therefore, disconnection hardly occurs. Thus it is possible to manufacture a highly reliable TFT-LCD.

What is claimed is:

1. A method for manufacturing an electro-optic element including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode and an opposite substrate having a second insulating substrate on which a color filter and a common electrode are formed, wherein the TFT array substrate and the opposite substrate are affixed with a liquid crystal layer interposed in-between and polarizers are placed outside the TFT array substrate and the opposite substrate, respectively, comprising the steps:

(a) forming the above gate line and the gate electrodes of the TFT by patterning a first metal thin film by a first photolithography process after forming the first metal thin film on the first insulating substrate;

(b) patterning by dry etching a semiconductor active film and an ohmic contact film by a second photolithography process wherein the semiconductor active film and the ohmic contact film are formed in a continuous shape and are larger than a portion in which the source line and the TFT are formed, wherein said patterning step occurs after forming a first insulating film, the semiconductor active film, and the ohmic contact film;

(c) patterning a second metal thin film by a third photolithography process after forming the second metal thin film to form a source line as well as a source electrode and a drain electrode of the TFT and etch-removing by dry etching the ohmic contact film protruding from the source line, the source electrode, and the drain electrode;

(d) patterning a second insulating film and the first insulating film by a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and (e) patterning an amorphous transparent conductive thin film and forming the pixel electrode by a fifth photolithography process after forming the amorphous transparent conductive thin film and (f) crystallizing the pixel electrode with properties being stabilized by annealing, wherein the above first metal thin film comprises at least two layers having a first layer comprising metal and a second layer thereon obtained by adding nitrogen atoms on a metal, and each of the above first and second metal thin films is one selected from the group consisting of Al, Ag and an alloy comprising Al or Ag as a main component.

2. The method for manufacturing electro-optic elements of claim 1, wherein the second layer which is obtained by adding nitrogen atoms to the above metal is positioned in the vicinity of the interface of the above first metal thin film electrically connected to the transparent, thin conductive film which forms the above pixel electrode through the above first contact hole.

3. The method for manufacturing electro-optic elements of claim 1, wherein the amorphous transparent, conductive thin film for the above pixel electrode comprises one selected from the group consisting of $In_2O_3$, $SnO_2$, $ZnO$, an oxide obtained by mixing $In_2O_3$ with $SnO_2$ and an oxide obtained by mixing $In_2O_3$ with $ZnO$.

4. A method for manufacturing electro-optic elements including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode and an opposite substrate having a second insulating substrate on which a color filter and a common electrode are formed, wherein the TFT array substrate and the opposite substrate are affixed with a liquid crystal layer interposed in-between and polarizers are placed outside the TFT array substrate and the opposite substrate, respectively, comprising the steps:

(a) forming the above gate line and the gate electrodes of the TFT by patterning a first metal thin film by a first photolithography process after forming the first metal thin film on the first insulating substrate;

(b) patterning by dry etching a semiconductor active film and an ohmic contact film by a second photolithography process wherein the semiconductor active film and the ohmic contact film are formed in a continuous shape and are larger than a portion in which the source line and the TFT are formed, wherein said patterning step occurs after forming a first insulating film, the semiconductor active film, and the ohmic contact film;

(c) patterning a second metal thin film by a third photolithography process after forming the second metal thin film to form a source line as well as a source electrode and a drain electrode of the TFT and etch-removing by dry etching the ohmic contact film protruding from the source line, the source electrode, and the drain electrode;

(d) patterning a second insulating film and the first insulating film by a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and (e) patterning an amorphous transparent conductive thin film and forming the pixel electrode by a fifth photolithography process after forming the amorphous transparent conductive thin film and (f) crystallizing the pixel electrode with properties being stabilized by annealing, wherein the above second metal thin film comprises at least two layers having a first layer comprising metal and a second layer thereon obtained by adding nitrogen atoms on a metal, and each of the above first and second metal thin films is one selected from the group consisting of Al, Ag and an alloy comprising Al or Ag as a main component.

5. The method for manufacturing electro-optic elements of claim 4, wherein the second layer which is obtained by adding nitrogen atoms to the above metal is positioned in the vicinity of the interface of the above second metal thin film electrically connected to the transparent, thin conductive film which forms the above pixel electrode through the above second contact hole.

6. The method for manufacturing electro-optic elements of claim 4, wherein the amorphous transparent, conductive thin film for the above pixel electrode comprises one selected from the group consisting of $In_2O_3$, $SnO_2$, ZnO, an oxide obtained by mixing $In_2O_3$ with $SnO_2$ and an oxide obtained by mixing $In_2O_3$ with ZnO.

7. A method for manufacturing electro-optic elements including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode and an opposite substrate having a second insulating substrate on which a color filter and a common electrode are formed, wherein the TFT array substrate and the opposite substrate are affixed with a liquid crystal layer interposed in-between and polarizers are placed outside the TFT array substrate and the opposite substrate, respectively, comprising the steps:

(a) forming the above gate line and the gate electrodes of the TFT by patterning a first metal thin film by a first photolithography process after forming the first metal thin film on the first insulating substrate;

(b) patterning by dry etching a semiconductor active film and an ohmic contact film by a second photolithography process wherein the semiconductor active film and the ohmic contact film are formed in a continuous shape and are larger than a portion in which the source line and the TFT are formed, wherein said patterning step occurs after forming a first insulating film, the semiconductor active film, and the ohmic contact film;

(c) patterning a second metal thin film by a third photolithography process after forming the second metal thin film to form a source line as well as a source electrode and a drain electrode of the TFT and etch-removing by dry etching the ohmic contact film protruding from the source line, the source electrode, and the drain electrode;

(d) patterning a second insulating film and the first insulating film by a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and (e) patterning an amorphous transparent conductive thin film and forming the pixel electrode by a fifth photolithography process after forming the amorphous transparent conductive thin film and (f) crystallizing the pixel electrode with properties being stabilized by annealing, wherein the above first and second metal thin films each comprises at least two layers having a first layer comprising metal and a second layer thereon obtained by adding nitrogen atoms on a metal, and each of the above first and second metal thin films is one selected from the group consisting of Al, Ag and an alloy comprising Al or Ag as a main component.

8. The method for manufacturing electro-optic elements of claim 7, wherein the second layer which is obtained by adding nitrogen atoms to the above metal is positioned in the vicinity of the interface of the above first and second thin metal films electrically connected to the transparent, thin conductive film which forms the above pixel electrode through the above first or second contact hole.

9. The method for manufacturing electro-optic elements of claim 7, wherein the amorphous transparent, conductive thin film for the above pixel electrode comprises one selected from the group consisting of $In_2O_3$, $SnO_2$, ZnO, an oxide obtained by mixing $In_2O_3$ with $SnO_2$ and an oxide obtained by mixing $In_2O_3$ with ZnO.

* * * * *